(12) United States Patent
Miki (10) Patent No.: US 10,476,391 B2
(45) Date of Patent: Nov. 12, 2019

(54) VOLTAGE CONVERTING DEVICE

(71) Applicants: AutoNetworks Technologies, Ltd., Yokkaichi, Mie (JP); Sumitomo Wiring Systems, Ltd., Yokkaichi, Mie (JP); Sumitomo Electric Industries, Ltd., Osaka (JP)

(72) Inventor: Atsushi Miki, Mie (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-shi, Osaka (JP)

( * ) Notice: Subject to any disclaimer, the term of this patent is extended or adjusted under 35 U.S.C. 154(b) by 0 days.

(21) Appl. No.: 16/302,959

(22) PCT Filed: May 15, 2017

(86) PCT No.: PCT/JP2017/018161
§ 371 (c)(1),
(2) Date: Nov. 19, 2018

(87) PCT Pub. No.: WO2017/199900
PCT Pub. Date: Nov. 23, 2017

(65) Prior Publication Data
US 2019/0305685 A1  Oct. 3, 2019

(30) Foreign Application Priority Data
May 20, 2016  (JP) .................................. 2016-101106

(51) Int. Cl.
*H02M 3/157* (2006.01)
*H02M 3/158* (2006.01)
(Continued)

(52) U.S. Cl.
CPC ........... *H02M 3/1582* (2013.01); *H02M 1/08* (2013.01); *H02M 2001/0009* (2013.01)

(58) Field of Classification Search
CPC .......... H02M 3/00; H02M 3/04; H02M 3/156; H02M 3/157; H02M 3/1582; H02M 1/08; H02M 2001/0009; H02M 2001/0006
See application file for complete search history.

(56) References Cited

U.S. PATENT DOCUMENTS 10,177,649 B1 *  1/2019  Ke ........................... H02M 1/08
10,263,523 B1 *  4/2019  Sonntag ................ H02M 3/158
(Continued)

FOREIGN PATENT DOCUMENTS

| JP | 2005-253182 A | 9/2005 |
| JP | 2010-038599 A | 2/2010 |
| JP | 2013-027231 A | 2/2013 |

OTHER PUBLICATIONS

International Search Report, Application No. PCT/JP2017/018161 dated Jul. 25, 2017.

*Primary Examiner* — Adolf D Berhane
(74) *Attorney, Agent, or Firm* — Honigman LLP (57) ABSTRACT

A voltage converting device that detects an anomaly wherein the duty ratio provided to a voltage converting portion does not converge to a normal range is provided. The voltage converting device includes: an output voltage detecting portion that detects a value indicating an output voltage of a voltage converting portion. A setting portion sets the duty ratio of a PWM signal provided to the voltage converting portion so as to bring the output voltage value of the voltage converting portion closer to a target voltage value. A driving portion outputs the PWM signal having the duty ratio set by the setting portion to the voltage converting portion. An anomaly detecting portion that detects an anomaly in which the duty ratio set by the setting portion does not converge to
(Continued)

a predetermined normal range when the voltage converting portion is in a predetermined stabilized state.

15 Claims, 4 Drawing Sheets

(51) Int. Cl.
  *H02M 1/08* (2006.01)
  *H02M 1/00* (2006.01)

(56) References Cited

U.S. PATENT DOCUMENTS

| | | | |
|---|---|---|---|
| 2005/0162023 A1* | 7/2005 | Habu | H02M 1/32 307/151 |
| 2006/0152085 A1* | 7/2006 | Flett | B60L 9/30 307/75 |
| 2019/0086462 A1* | 3/2019 | Sugisawa | G01R 31/006 |

* cited by examiner

PWM signal provided to T1

PWM signal provided to T2

(B)

PWM signal provided to T1

PWM signal provided to T2 a# VOLTAGE CONVERTING DEVICE

CROSS-REFERENCE TO RELATED APPLICATIONS

This application is the U.S. national stage of PCT/JP2017/018161 filed May 15, 2017, which claims priority of Japanese Patent Application No. JP 2016-101106 filed May 20, 2016.

TECHNICAL FIELD

The present disclosure relates to a voltage converting device.

BACKGROUND

JP 2013-240176A discloses a power supply device that includes a DCDC converter including an output inductor, and a power supply control portion that feeds back the output voltage of the DCDC converter and sets the duty ratio of a pulse-modulated pulse signal, and controls the output voltage based on the pulse width modulation. The power supply control portion is configured to, when changing the output voltage, gradually change the voltage command value provided to the DCDC converter with a value less than or equal to the maximum command value variation every output voltage receiving period.

The power supply device described above performs control so as to adjust the degree to which the voltage is increased or decreased by the DCDC converter such that the output voltage reaches the designated target voltage. As the method for controlling the degree to which the voltage is increased or decreased, a method is known in which the degree to which the voltage is increased or decreased is controlled by adjusting the duty ratio of a PWM signal provided to a switching element of the DCDC converter. The output voltage can be brought closer to the target voltage by, for example, when the output voltage is lower than the target voltage, making an adjustment so as to increase the duty ratio of the PWM signal such that the output voltage will be higher than the target voltage, or when the output voltage is higher than the target voltage, making an adjustment so as to reduce the duty ratio of the PWM signal such that the output voltage will be lower than the target voltage.

However, when the duty ratio of the PWM signal is feedback controlled so as to bring the output voltage closer to the target voltage while monitoring the output voltage as described above, the problem arises that feedback control is not performed appropriately when the detection value of the output voltage indicates an anomaly for some reason. For example, if a detection anomaly in which the detection value of the output voltage indicates 0 V occurs while lowering the voltage (buck control) from the high voltage power supply side toward the low voltage power supply side, simply performing the above-described feedback control causes the processing of increasing the duty ratio of the PWM signal to be continuously performed, and in the end, the duty ratio reaches 1 (i.e., 100%) excluding the deadtime. That is, a similar level of voltage as the input voltage is output, and a problem arises in that an excessively high voltage is output to low voltage power supply side. This problem occurs not only when buck control is performed, but also when boost control is performed.

The present disclosure has been made under the circumstances described above, and it is an object of the present disclosure to provide a voltage converting device that can detect an anomaly in which the duty ratio provided to the voltage converting portion does not converge to a normal range.

SUMMARY

A voltage converting device according to the present disclosure includes: a voltage converting portion that increases or decreases an input voltage through on/off operations of a switching element and then outputs the voltage. An output voltage detecting portion detects a value that indicates an output voltage of the voltage converting portion. A setting portion sets, based on a set target voltage value and a detection value obtained by the output voltage detecting portion, a duty ratio of a PWM signal that is provided to the voltage converting portion so as to bring the output voltage value of the voltage converting portion closer to the target voltage value. A driving portion outputs the PWM signal having the duty ratio set by the setting portion to the voltage converting portion. An anomaly detecting portion detects an anomaly in which the duty ratio set by the setting portion does not converge to a predetermined normal range when the voltage converting portion is in a predetermined stabilized state.

Advantageous Effects of Disclosure

The voltage converting device according to the present disclosure includes an anomaly detecting portion that detects an anomaly in which the duty ratio set by the setting portion does not converge to a predetermined normal range. With this configuration, it is possible to detect an anomaly in which the duty ratio set through feedback control does not converge to a normal range.

In particular, it is possible to detect an anomaly in which the duty ratio set by the setting portion does not converge to a normal range despite the fact that the voltage converting portion is in a stabilized state, and thus erroneous anomaly detection can be suppressed, and highly accurate anomaly detection can be performed. For example, if an anomaly in which the duty ratio does not converge to a normal range despite the fact that the voltage converting portion is in a stabilized state (in which the duty ratio should converge to the normal range) occurs as a result of control being performed so as to excessively increase or decrease the voltage due to failure of monitoring of the output voltage detecting portion, the anomaly can be detected by the anomaly detecting portion.

DETAILED DESCRIPTION OF PREFERRED EMBODIMENTS

Desirable embodiments of the present disclosure will be listed below.

The present disclosure may include an input voltage detecting portion that detects a value that indicates an input voltage of the voltage converting portion. The anomaly detecting portion may be configured to detect, based on the target voltage value and a detection value obtained by the input voltage detecting portion, the anomaly in which the duty ratio set by the setting portion does not converge to the predetermined normal range.

With this configuration, the anomaly in which the duty ratio set by the setting portion does not converge to the predetermined normal range can be detected based on the target voltage value and the detection value obtained by the input voltage detecting portion. That is, it is possible to determine whether or not an anomaly in which the duty ratio does not converge to the normal range has occurred without depending on the result of monitoring the output voltage.

The anomaly detecting portion may be configured to determine, based on the detection value obtained by the input voltage detecting portion, whether or not the input voltage that is input to the voltage converting portion is in a predetermined input voltage stabilized state as a condition for the predetermined stabilized state, and detect the anomaly in which the duty ratio set by the setting portion does not converge to the predetermined normal range if it is determined that the input voltage is in the predetermined input voltage stabilized state.

With this configuration, it is possible to detect an anomaly in which the duty ratio does not converge to the normal range despite the fact that the input voltage is stabilized.

The anomaly detecting portion may be configured to determine, based on the detection value obtained by the output voltage detecting portion, whether or not an output voltage that is output from the voltage converting portion is in a predetermined output voltage stabilized state as a condition for the predetermined stabilized state, and detect the anomaly in which the duty ratio set by the setting portion does not converge to the predetermined normal range if it is determined that the output voltage is in the predetermined output voltage stabilized state.

With this configuration, it is possible to detect an anomaly in which the duty ratio does not converge to the normal range despite the fact that the output voltage is stabilized.

The present disclosure may include an output current detecting portion that detects a value that indicates an output current of the voltage converting portion. The setting portion may be configured to limit an increase of the duty ratio of the PWM signal that is provided to the voltage converting portion when the output current from the voltage converting portion reaches a pre-set maximum current value. The anomaly detecting portion may be configured to determine, based on the detection value obtained by the output current detecting portion, whether or not the output current from the voltage converting portion has reached the maximum current value, and detect the anomaly in which the duty ratio set by the setting portion does not converge to the predetermined normal range if it is determined that the output current has not reached the maximum current value.

By limiting the increase of the duty ratio of the PWM signal provided to the voltage converting portion when the output current from the voltage converting portion reaches a pre-set maximum current value, it is possible to prevent the output current from increasing above the maximum current value. However, when the output current reaches the maximum current value as described above, due to the limitation of the duty ratio for preventing the increase of electric current, an anomaly may occur in which the duty ratio does not converge to a normal range. Accordingly, with a configuration in which an anomaly in which the duty ratio set by the setting portion does not converge to a predetermined normal range is detected before the output current reaches the maximum current value, it is possible to prevent a problem in that an anomaly is detected each time the output current reaches the maximum current value, and an anomaly that needs to be detected can be detected more accurately.

Example 1

Hereinafter, Example 1 in which the present disclosure is implemented will be described.

Figure 1:
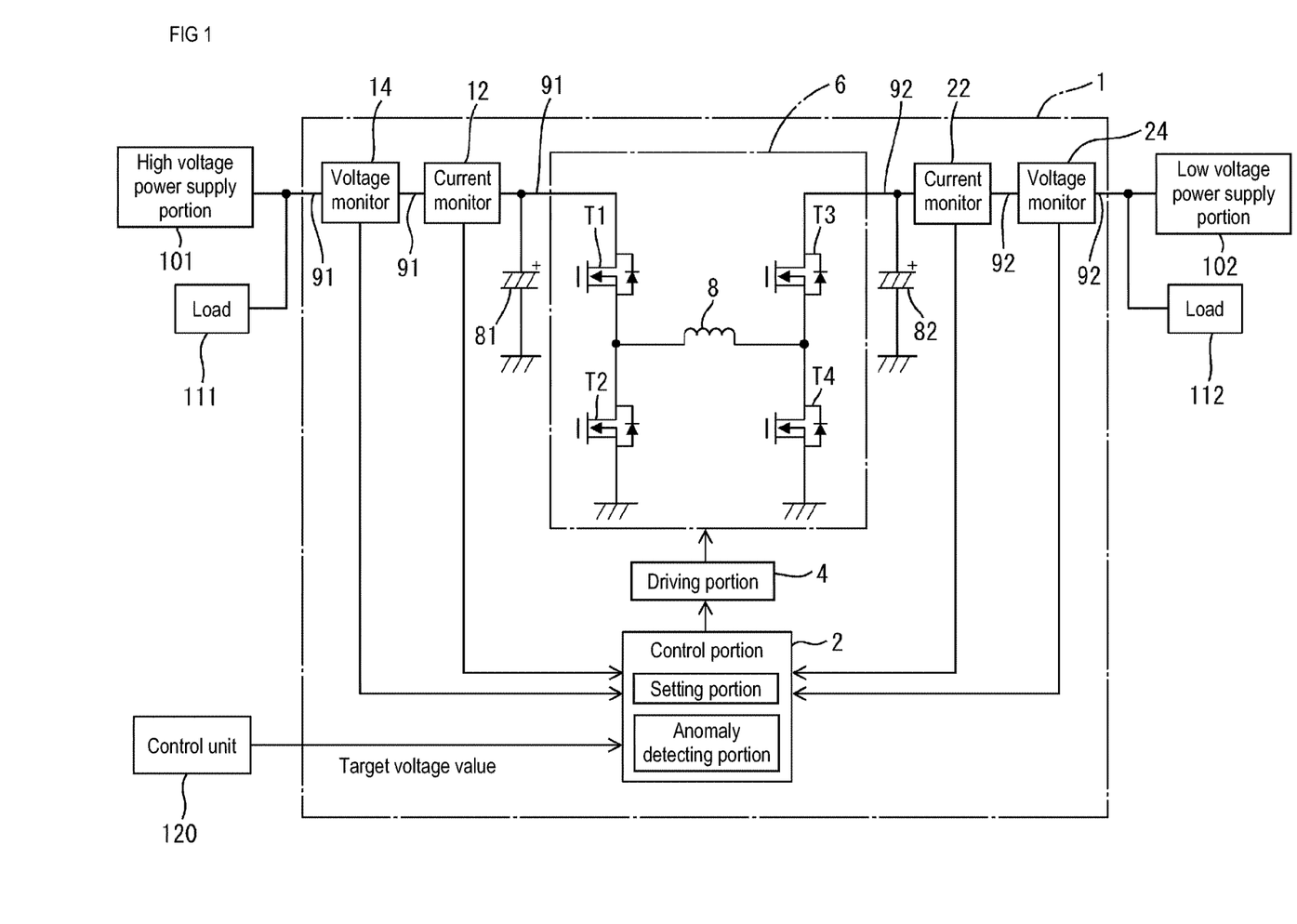
FIG. 1 is a circuit diagram schematically showing a voltage converting device of Example 1.

A voltage converting device 1 shown in FIG. 1 is configured as, for example, a vehicle-mounted buck-boost DCDC converter that is configured to increase or decrease the direct current voltage applied to one of a first conductive path 91 and a second conductive path 92, and output the voltage to the other conductive path.

The voltage converting device 1 includes the first conductive path 91 and the second conductive path 92 that function as a power line. The first conductive path 91 is a wire that is electrically connected to a high potential-side terminal of a high voltage power supply portion 101 that is a first power supply portion, and is configured to receive a predetermined direct current voltage applied from the high voltage power supply portion 101. The second conductive path 92 is a wire that is electrically connected to a high potential-side terminal of a low voltage power supply portion 102 that is a second power supply portion, and is configured to receive a predetermined direct current voltage applied from the low voltage power supply portion 102.

The high voltage power supply portion 101 and the low voltage power supply portion 102 are configured using known power storage means, for example, lead storage batteries, lithium ion batteries, electric double-layer capacitors, lithium ion capacitors, or other power storage portions. The output voltages of the high voltage power supply portion 101 and the low voltage power supply portion 102 are not particularly limited to specific values as long as the output voltage of the high voltage power supply portion 101 is higher than the output voltage of the low voltage power supply portion 102. The low potential-side terminals of the high voltage power supply portion 101 and the low voltage power supply portion 102 are maintained at a ground voltage (0 V).

A vehicle-mounted load 111 is connected to the first conductive path 91 that is connected to the high voltage power supply portion 101, and the vehicle-mounted load 111 is configured to receive a supply of power from the high voltage power supply portion 101. A vehicle-mounted load 112 is connected to the second conductive path 92 that is connected to the low voltage power supply portion 102, and the vehicle-mounted load 112 is configured to receive a supply of power from the low voltage power supply portion 102. The vehicle-mounted loads 111 and 112 are known vehicle-mounted electric components, and the type of electric component is not particularly limited.

A voltage converting portion 6 has a function of increasing or decreasing the input voltage through on/off operations of switching elements T1, T2, T3, and T4, and then outputting the voltage. The voltage converting portion 6 is provided between the first conductive path 91 and the second conductive path 92, and has a buck function of decreasing the voltage applied to the first conductive path 91 and then outputting the voltage to the second conductive path 92, and a boost function of increasing the voltage applied to the second conductive path 92 and then outputting the voltage to the first conductive path 91.

The voltage converting portion 6 includes the switching elements T1, T2, T3, and T4 that are arranged in an H-bridge structure, and a coil 8, and functions as a so-called bidirectional DCDC converter. The switching elements T1, T2, T3, and T4 are all constituted by MOSFETs. A capacitor 81 is provided on the first conductive path 91, and a capacitor 82 is provided on the second conductive path 92.

In the voltage converting portion 6, the drain of the switching element T1 is connected to the first conductive path 91, and the source of the switching element T1 is connected to the drain of the switching element T2 and one end of the coil 8. The drain of the switching element T3 is connected to the second conductive path 92, and the source of the switching element T3 is connected to the drain of the switching element T4 and the other end of the coil 8. The sources of the switching elements T2 and T4 are connected to the ground. The gates of the switching elements T1, T2, T3, and T4 receive respective signals from a driving portion 4, which will be described later.

Current detection circuits (current monitors) 12 and 22 are both configured as known current detection circuits. The current detection circuit 12 is a current detection circuit that detects an electric current that flows through the first conductive path 91, and includes, for example, a shunt resistor that is provided on the first conductive path 91, and a differential amplifier that amplifies and outputs the voltage across the terminals of the shunt resistor. The current detection circuit 22 is a current detection circuit that detects an electric current that flows through the second conductive path 92, and includes, for example, a shunt resistor that is provided on the second conductive path 92, and a differential amplifier that amplifies and outputs the voltage across the terminals of the shunt resistor. A control portion 2 obtains a current value of electric current flowing through the first conductive path 91 based on a value input from the current detection circuit 12 (the detection value of the current detection circuit 12), and also obtains a current value of electric current flowing through the second conductive path 92 based on a value input from the current detection circuit 22 (the detection value of the current detection circuit 22).

Voltage detection circuits (voltage monitors) 14 and 24 are both configured as known voltage detection circuits. The voltage detection circuit 14 inputs, to the control portion 2, a value that indicates the voltage of the first conductive path 91 (for example, the voltage value of the first conductive path 91, or a value obtained by dividing the voltage value of the first conductive path 91 using a voltage divider circuit, or the like) as a detection value. The voltage detection circuit 24 inputs, to the control portion 2, a value that indicates the voltage of the second conductive path 92 (for example, the voltage value of the second conductive path 92, or a value obtained by dividing the voltage value of the second conductive path 92 using a voltage divider circuit, or the like) as a detection value. The control portion 2 obtains the voltage value of the first conductive path 91 based on the value input from the voltage detection circuit 14 (the detection value of the voltage detection circuit 14), and also obtains the voltage value of the second conductive path 92 based on the value input from the voltage detection circuit 24 (the detection value of the voltage detection circuit 14).

The control portion 2 is configured as, for example, a microcomputer. The control portion 2 performs feedback control using a known method based on the current value input from the current detection circuit 12 or 22, the voltage value input from the voltage detection circuit 14 or 24, and a target voltage value set by a control unit 120, and sets the duty ratio for a PWM signal that is provided to the voltage converting portion 6. Then, the control portion 2 outputs the PWM signal that has the set duty ratio to the driving portion 4.

The control unit 120 configured as an ECU is provided outside the voltage converting device 1. The control unit 120 is capable of communication with the voltage converting device 1 through, for example, CAN communication, and has a function of transmitting the target voltage value to the voltage converting device 1. The control portion 2 performs the aforementioned feedback control using the target voltage value input from the control unit 120.

The driving portion 4 is a circuit that outputs a control signal for turning on and off the switching elements T1, T2, T3, and T4. The driving portion 4 has a function of outputting, to the voltage converting portion 6, the PWM signal that has the duty ratio set by the control portion 2 which corresponds to a setting portion.

Figure 4:
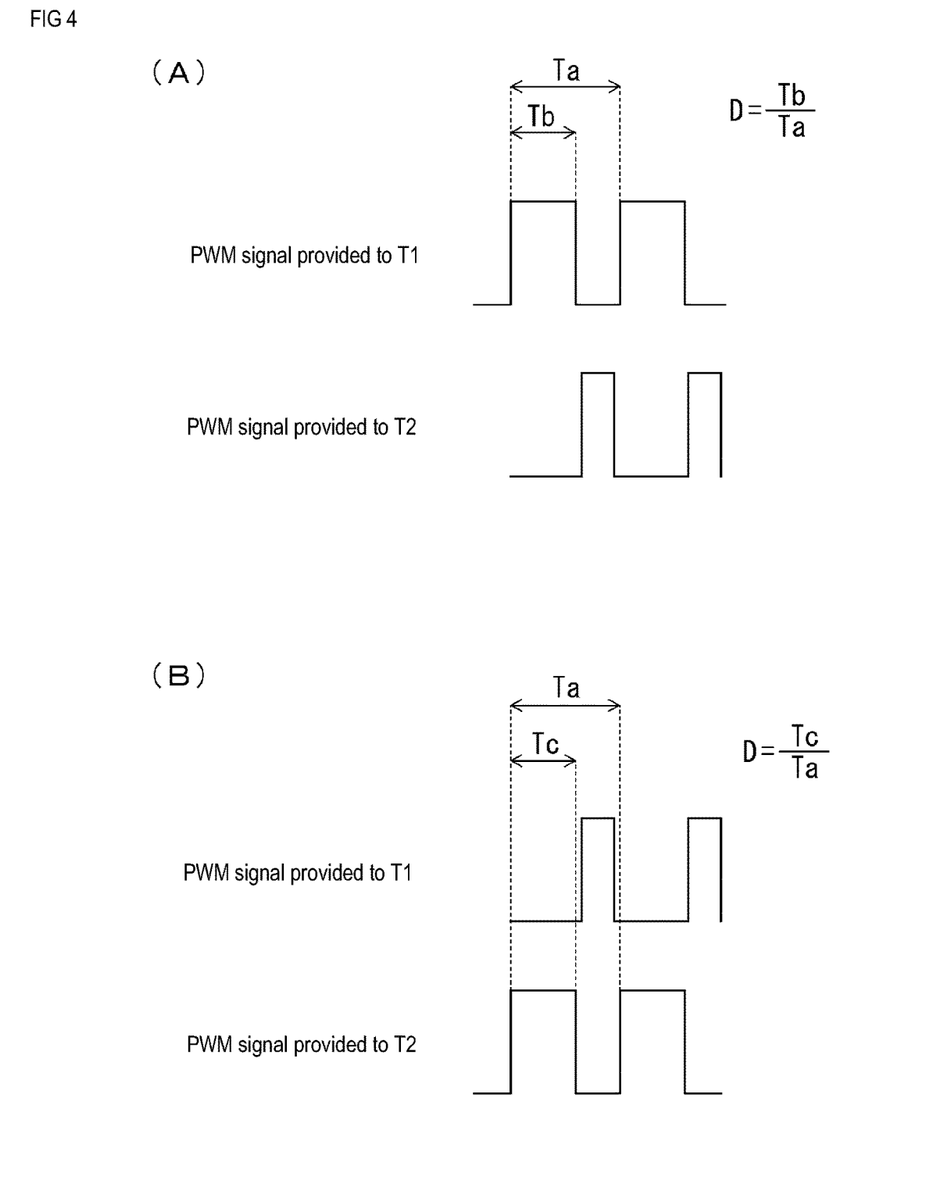
FIG. 4(A) is a diagram illustrating PWM signals during buck control.
FIG. 4(B) is a diagram illustrating PWM signals during boost control.

In a buck mode, as shown in FIG. 4(A), PWM signals with dead time are complementarily output to the respective gates of the switching elements T1 and T2. An off signal is output to the switching element T2 while an on signal is output to the switching element T1, and an on signal is output to the switching element T2 while an off signal is output to the switching element T1. When a first state, in which the switching element T1 is on, and the switching element T2 is off, and a second state, in which the switching element T1 is off, and the switching element T2 is on, are alternately switched, the direct current voltage applied to the first conductive path 91 is decreased and output to the second conductive path 92. The output voltage of the second conductive path 92 is determined according to the duty ratio D of the PWM signal that is provided to the gate of the switching element T1. As shown in FIG. 4(A), the duty ratio D is represented by D=Tb/Ta, where the cycle of the PWM signal provided to the switching element T1 is represented by Ta, and the on period of the PWM signal provided to the switching element T1 is represented by Tb. In the buck mode, an on signal is continuously input to the gate of the switching element T3, and the switching element T3 is kept on. Also, an off signal is continuously input to the gate of the switching element T4, and the switching element T4 is kept off.

As described above, in the buck mode, the control portion 2 that functions as the setting portion performs feedback control according to a known method, and sets the duty ratio of the PWM signal provided to the voltage converting portion 6 so as to bring the output voltage value of the voltage converting portion 6 closer to the target voltage value, based on the pre-set target voltage value and the detection value obtained by the voltage detection circuit 24 (output voltage detecting portion). The control portion 2 continuously performs such feedback control while the voltage converting portion 6 is operating in the buck mode. However, when the output current from the voltage converting portion 6 reaches a pre-set maximum current value (upper limit value), the control portion 2 limits the increase of the duty ratio of the PWM signal provided to the voltage converting portion 6. That is, when the output current value of the voltage converting portion 6 reaches the maximum current value, even if the output voltage value is lower than the target voltage value, the control portion 2 performs control so as to maintain the duty ratio instead of performing control so as to increase the duty ratio (or in other words, control so as to increase the output voltage).

In the buck mode, the first conductive path 91 serves as an input side conductive path, and the second conductive path 92 serves as an output side conductive path. In this case, the voltage detection circuit 14 functions as an input voltage detecting portion, and inputs a value (detection value) that indicates the input voltage of the voltage converting portion 6 to the control portion 2. Also, the voltage detection circuit 24 functions as an output voltage detecting portion, and inputs a value (detection value) that indicates the output voltage of the voltage converting portion 6 to the control portion 2. The current detection circuit 22 functions as an output current detecting portion, and inputs a value (detection value) that indicates the output current of the voltage converting portion 6 to the control portion 2.

In a boost mode, as shown in FIG. 4(B), PWM signals with dead time are complementarily output to the respective gates of the switching elements T1 and T2. An on signal is output to the switching element T2 while an off signal is output to the switching element T1, and an off signal is output to the switching element T2 while an on signal is output to the switching element T1. When a first state, in which the switching element T1 is off, and the switching element T2 is on, and a second state, in which the switching element T1 is on, and the switching element T2 is off, are alternately switched, the direct current voltage applied to the second conductive path 92 is increased and output to the first conductive path 91. The output voltage of the first conductive path 91 is determined according to the duty ratio D of the PWM signal that is provided to the switching element T2. As shown in FIG. 4(B), the duty ratio D is represented by D=Tc/Ta, where the cycle of the PWM signal provided to the switching element T2 is represented by Ta, and the on period of the PWM signal provided to the switching element T2 is represented by Tc. In the boost mode, an on signal is continuously input to the gate of the switching element T3, and the switching element T3 is kept on. Also, an off signal is continuously input to the gate of the switching element T4, and the switching element T4 is kept off.

As described above, in the boost mode as well, the control portion 2 that functions as the setting portion performs feedback control according to a known method, and sets the duty ratio of the PWM signal provided to the voltage converting portion 6 so as to bring the output voltage value of the voltage converting portion 6 closer to the target voltage value, based on the pre-set target voltage value and the detection value obtained by the voltage detection circuit 14 (output voltage detecting portion). The control portion 2 continuously performs such feedback control while the voltage converting portion 6 is operating in the boost mode. However, when the output current from the voltage converting portion 6 reaches a pre-set maximum current value (upper limit value), the control portion 2 limits the increase of the duty ratio of the PWM signal provided to the voltage converting portion 6. That is, when the output current value of the voltage converting portion 6 reaches the maximum current value, even if the output voltage value is lower than the target voltage value, the control portion 2 performs control so as to maintain the duty ratio instead of performing control so as to increase the duty ratio (or in other words, control so as to increase the output voltage).

In the boost mode, the second conductive path 92 serves as an input side conductive path, and the first conductive path 91 serves as an output side conductive path. In this case, the voltage detection circuit 24 functions as an input voltage detecting portion, and inputs a value (detection value) that indicates the input voltage of the voltage converting portion 6 to the control portion 2. Also, the voltage detection circuit 14 functions as an output voltage detecting portion, and inputs a value (detection value) that indicates the output voltage of the voltage converting portion 6 to the control portion 2. The current detection circuit 12 functions as an output current detecting portion, and inputs a value (detection value) that indicates the output current of the voltage converting portion 6 to the control portion 2.

Next, anomaly determining processing executed while the voltage converting device 1 is in operation will be described.

Figure 2:
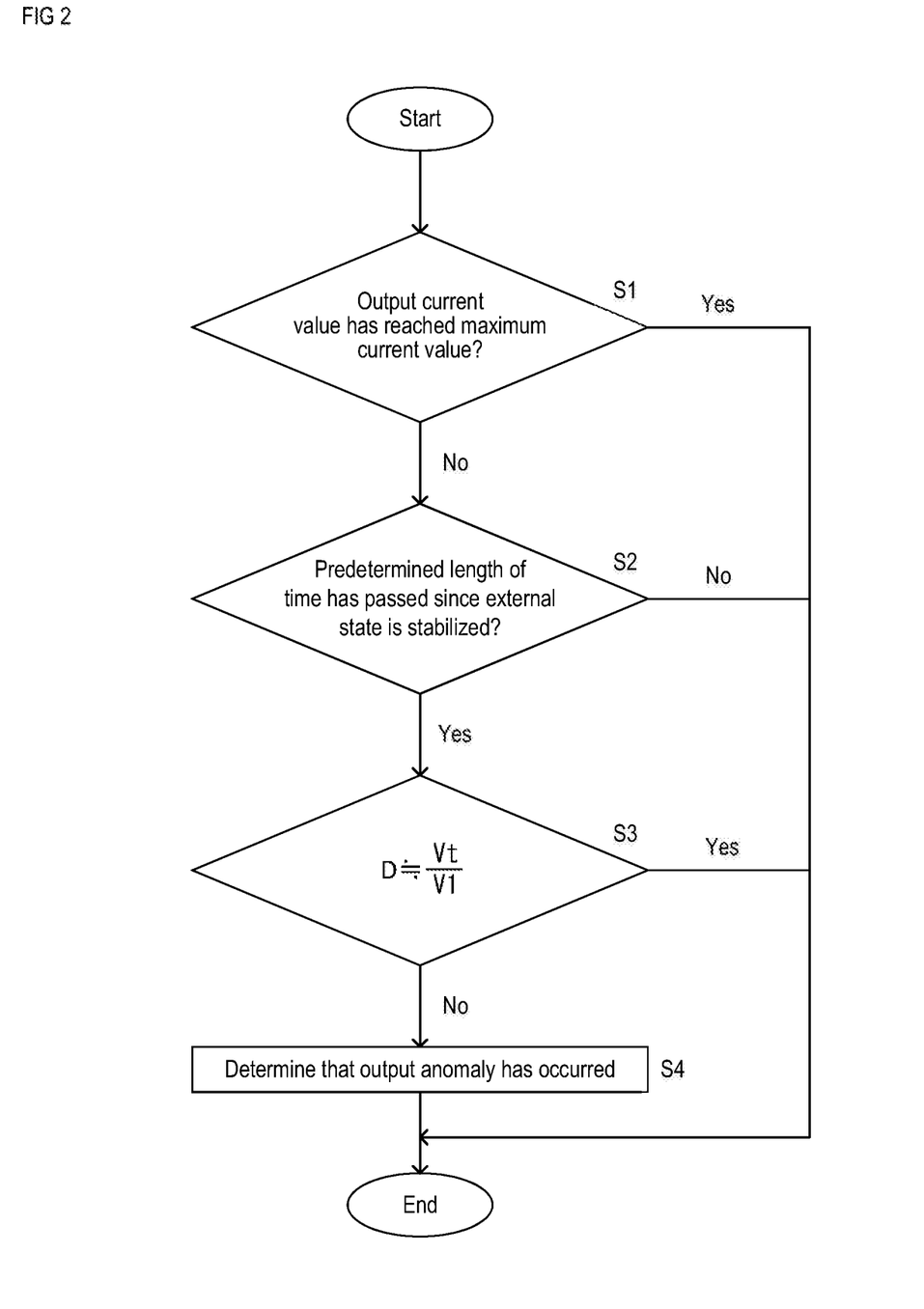
FIG. 2 is a flowchart illustrating a flow of anomaly determining processing during buck control executed by the voltage converting device of Example 1.

First, anomaly determining processing executed in the buck mode will be described. The anomaly determining processing shown in FIG. 2 is processing performed periodically at short time intervals by the control portion 2 when the voltage converting portion 6 is in the buck mode. Upon start of the anomaly determining processing shown in FIG. 2, the control portion 2 determines, based on the detection value input from the current detection circuit 22, whether or not the output current value of the voltage converting portion 6 (the current value of electric current flowing through the second conductive path 92) has reached a predetermined maximum current value (S1). If the output current value has reached the maximum current value, an affirmative determination (YES) is made in step S1, and the anomaly determining processing shown in FIG. 2 ends.

If it is determined in step S1 that the output current value has not reached the maximum current value, (NO in S1), the control portion 2 determines, in step S2, whether or not a predetermined length of time has passed since the external state is stabilized. As used herein, the expression "the external state is stabilized" corresponds to an example of "predetermined stabilized state", and refers to a state in which, for example, the input voltage is maintained at a constant level, and the output voltage is maintained at a constant level. For example, at the time of determination processing in step S2, if a state in which the variation of the input voltage value is within a predetermined range (a predetermined voltage difference) has lasted for a predetermined length of time, and a state in which the variation of the output voltage value is within a predetermined range (a predetermined voltage difference) has lasted for a predetermined length of time, the control portion 2 makes an affirmative determination (YES) in step S2. Otherwise, the control portion 2 makes a negative determination (NO) in step S2. If a negative determination (NO) is made in step S2, the anomaly determining processing shown in FIG. 2 ends.

If it is determined in the determination processing in step S2 that a predetermined length of time has passed since the external state is stabilized (if it is determined that a state in which the variation of the input voltage value is within a predetermined voltage difference has lasted for a predetermined length of time, and a state in which the variation of the output voltage value is within a predetermined voltage difference has lasted for a predetermined length of time), the control portion 2 determines, in step S3, whether or not the duty ratio D converges to a predetermined normal range. Specifically, the control portion 2 determines, based on the input voltage value V1 obtained from the detection value of the voltage detection circuit 14 and the target voltage value Vt set in accordance with an instruction from the control unit 120, whether or not the duty ratio D that is set at the time of processing in S3 converges to a value close to Vt/V1. If the difference between the duty ratio D and Vt/V1 is less than a predetermined value, the control portion 2 makes an affirmative determination (YES) in step S3, and the anomaly determining processing shown in FIG. 2 ends.

If it is determined in step S3 that the difference between the duty ratio D and Vt/V1 is greater than or equal to the predetermined value (NO in S3), the control portion 2 determines, in step S4, that an output anomaly has occurred. If it is determined in step S4 that an output anomaly has occurred, the control portion 2, for example, stops outputting the PWM signal to the voltage converting portion 6, and stops the operation of the voltage converting portion 6. Then, the control portion 2 transmits, to an external ECU, information indicating that an anomaly has occurred in the voltage converting portion 6.

Figure 3:
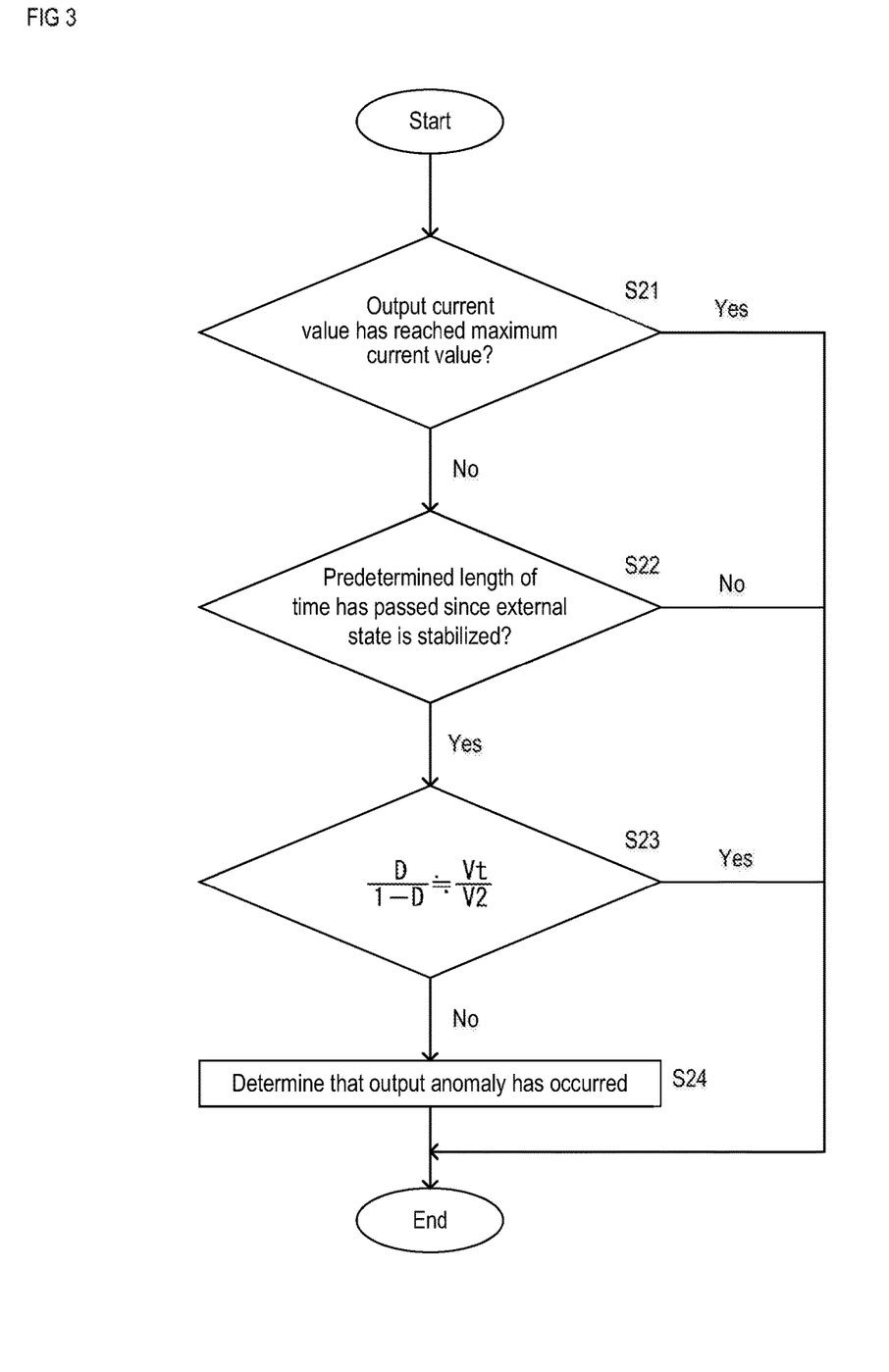
FIG. 3 is a flowchart illustrating a flow of anomaly determining processing during boost control executed by the voltage converting device of Example 1.

Next, anomaly determining processing executed in the boost mode will be described. The anomaly determining processing shown in FIG. 3 is processing performed periodically at short time intervals by the control portion 2 when the voltage converting portion 6 is in the boost mode. Upon start of the anomaly determining processing shown in FIG. 3, the control portion 2 determines, based on the detection value input from the current detection circuit 22, whether or not the output current value of the voltage converting portion 6 (the current value of electric current flowing through the first conductive path 91) has reached a predetermined maximum current value (S21). If it is determined that the output current value has reached the maximum current value, an affirmative determination (YES) is made in step S21, and the anomaly determining processing shown in FIG. 3 ends.

If it is determined in step S21 that the output current value has not reached to maximum current value (NO in S21), the control portion 2 determines, in step S22, whether or not a predetermined length of time has passed since the external state is stabilized. As used herein, the expression "the external state is stabilized" refers to, as described above, a state in which, for example, the input voltage is maintained at a constant level, and the output voltage is maintained at a constant level. For example, at the time of determination processing in step S22, if a state in which the variation of the input voltage value is within a predetermined range (a predetermined voltage difference) has lasted for a predetermined length of time, and a state in which the variation of the output voltage value is within a predetermined range (a predetermined voltage difference) has lasted for a predetermined length of time, the control portion 2 makes an affirmative determination (YES) in step S22. Otherwise, the control portion 2 makes a negative determination (NO) in step S22. If a negative determination (NO) is made in step S22, the anomaly determining processing shown in FIG. 3 ends.

If it is determined in the determination processing in step S22 that a predetermined length of time has passed since the external state is stabilized (if it is determined that a state in which the variation of the input voltage value is within a predetermined voltage difference has lasted for a predetermined length of time, and a state in which the variation of the output voltage value is within a predetermined voltage difference has lasted for a predetermined length of time), the control portion 2 determines, in step S23, whether or not the duty ratio D is within a predetermined normal range. Specifically, the control portion 2 determines, based on the input voltage value V2 obtained from the detection value of the voltage detection circuit 24 and the target voltage value Vt set in accordance with an instruction from the control unit 120, whether or not $D/(1-D)$ converges to a value close to $Vt/V2$ at the time of processing in S3. That is, it is determined whether or not the duty ratio D that is set at the time of processing in S3 converges to a value close to $Vt/(V2+Vt)$. If the difference between $D/(1-D)$ and $Vt/V2$ is less than a predetermined value, the control portion 2 makes an affirmative determination (YES) in step S23, and the anomaly determining processing shown in FIG. 3 ends.

If it is determined in step S23 that the difference between $D/(1-D)$ and $Vt/V2$ is greater than or equal to the predetermined value (NO in S23), the control portion 2 determines, in step S24, that an output anomaly has occurred. If it is determined in step S24 that an output anomaly has occurred, the control portion 2, for example, stops outputting the PWM signal to the voltage converting portion 6, and stops the operation of the voltage converting portion 6. Then, the control portion 2 transmits, to an external ECU, information indicating that an anomaly has occurred in the voltage converting portion 6.

In this configuration, the control portion 2 that performs the processing operations shown in FIG. 2 and FIG. 3 corresponds to an example of the anomaly detecting portion, and functions to detect an anomaly in which the duty ratio set by the setting portion when the voltage converting portion 6 is in a predetermined stabilized state (specifically, if an affirmative determination (YES) is made in S2 and S22) does not converge to a predetermined normal range. Specifically, in the case of the buck mode shown in FIG. 2, the control portion 2 detects, based on the target voltage value Vt and the detection value obtained by the voltage detection circuit 14 (input voltage detecting portion), an anomaly in which the duty ratio D set through feedback control does not converge to a predetermined normal range (a range in which the difference to $Vt/V1$ is less than a predetermined value). Also, in the case of the boost mode shown in FIG. 3, the control portion 2 detects, based on the target voltage value Vt and the detection value obtained by the voltage detection circuit 24 (input voltage detecting portion), an anomaly in which the duty ratio D set through feedback control does not converge to a predetermined normal range (a range in which the difference to $Vt/(V2+Vt)$ is less than a predetermined value).

As described above, the voltage converting device 1 includes an anomaly detecting portion that detects an anomaly in which the duty ratio set by the setting portion when the voltage converting portion 6 is in a predetermined stabilized state does not converge to a predetermined normal range. With this configuration, it is possible to detect an anomaly in which the duty ratio set through feedback control does not converge to a normal range despite the fact that the voltage converting portion 6 is in a stabilized state.

For example, if an anomaly in which the duty ratio does not converge to a normal range despite the fact that the voltage converting portion is in a stabilized state (in which the duty ratio should converge to the normal range) occurs as a result of control being performed so as to excessively increase or decrease the voltage due to failure of monitoring of the output voltage detecting portion, the anomaly can be detected by the anomaly detecting portion.

The voltage converting device 1 includes an input voltage detecting portion that detects a value that indicates the input voltage of the voltage converting portion 6. The anomaly detecting portion detects, based on the target voltage value and the detection value obtained by the input voltage detecting portion, an anomaly in which the duty ratio set by the setting portion does not converge to a predetermined normal range. For example, in the case of the buck mode, the anomaly detecting portion detects an anomaly in which the duty ratio set by the setting portion does not converge to a predetermined normal range based on the target voltage value and the detection value obtained by the voltage detection circuit 14. In the case of the boost mode, the anomaly detecting portion detects an anomaly in which the duty ratio set by the setting portion does not converge to a predetermined normal range based on the target voltage value and the detection value obtained by the voltage detection circuit 24. With this configuration, it is possible to detect an anomaly in which the duty ratio set by the setting portion does not converge to a predetermined normal range based on the target voltage value and the detection value obtained by the input voltage detecting portion. That is, it is possible to determine whether or not an anomaly in which the duty ratio does not converge to a normal range has occurred without depending on the result of monitoring the output voltage.

The control portion 2 that corresponds to the anomaly detecting portion determines, based on the detection value obtained by the input voltage detecting portion, whether or not the input voltage that is input to the voltage converting portion is in a predetermined input voltage stabilized state, as a condition for the "predetermined stabilized state". For example, in the buck mode shown in FIG. 2, the control portion 2 determines, based on the detection value obtained by the voltage detection circuit 14 (input voltage detecting portion), whether or not the input voltage that is input to the voltage converting portion 6 is in a predetermined input voltage stabilized state (specifically, whether or not a state in which the variation of the input voltage value V1 is within a predetermined voltage difference has lasted for a predetermined length of time). In the boost mode shown in FIG. 3, the control portion 2 determines, based on the detection value obtained by the voltage detection circuit 24 (input voltage detecting portion), whether or not the input voltage that is input to the voltage converting portion 6 is in a predetermined input voltage stabilized state (specifically, whether or not a state in which the variation of the input voltage value V2 is within a predetermined voltage difference has lasted for a predetermined length of time). In either mode, the control portion 2 detects an anomaly in which the duty ratio D does not converge to a predetermined normal range while the input voltage is stable. With this configuration, it is possible to detect an anomaly in which the duty ratio does not converge to a normal range despite the fact that the input voltage is stabilized.

The control portion 2 that corresponds to an anomaly detecting portion determines, based on the detection value obtained by the output voltage detecting portion, whether or not the output voltage that is output from the voltage converting portion is in a predetermined output voltage stabilized state, as a condition for "predetermined stabilized state". In the buck mode shown in FIG. 2, the control portion 2 determines, based on the detection value obtained by the voltage detection circuit 24 (output voltage detecting portion), whether the output voltage that is output from the voltage converting portion 6 is in a predetermined output voltage stabilized state (specifically, whether or not a state in which the variation of the output voltage value V2 is within a predetermined voltage difference has lasted for a predetermined length of time). In the boost mode shown in FIG. 3, the control portion 2 determines, based on the detection value obtained by the voltage detection circuit 14 (output voltage detecting portion), whether or not the output voltage that is output from the voltage converting portion 6 is in a predetermined output voltage stabilized state (specifically, whether or not a state in which the variation of the output voltage value V1 is within a predetermined voltage difference has lasted for a predetermined length of time). In either mode, the control portion 2 detects an anomaly in which the duty ratio D does not converge to a predetermined normal range while the output voltage is stable. With this configuration, it is possible to detect an anomaly in which the duty ratio does not converge to a normal range despite the fact that the output voltage is stabilized.

In the voltage converting device 1, the control portion 2 that corresponds to the setting portion is configured to limit the increase of the duty ratio of the PWM signal provided to the voltage converting portion 6 when the output current from the voltage converting portion 6 has reached a pre-set maximum current value. Then, as in step S1 shown in FIG. 2, and step S21 shown in FIG. 3, the control portion 2 that corresponds to the anomaly detecting portion determines, based on the detection value obtained by the output current detecting portion, whether or not the output current from the voltage converting portion 6 has reached the maximum current value. The control portion 2 is configured to detect an anomaly in which the duty ratio set through feedback control does not converge to a predetermined normal range when the output current has not reached the maximum current value.

By limiting the increase of the duty ratio of the PWM signal provided to the voltage converting portion 6 when the output current from the voltage converting portion 6 reaches a pre-set maximum current value, it is possible to prevent the output current from increasing above the maximum current value. However, when the output current reaches the maximum current value as described above, due to the limitation of the duty ratio for preventing the increase of electric current, an anomaly may occur in which the duty ratio does not converge to a normal range. Accordingly, with a configuration in which an anomaly in which the duty ratio set by the setting portion does not converge to a predetermined normal range is detected before the output current reaches the maximum current value, it is possible to prevent a problem in that an anomaly is detected each time the output current reaches the maximum current value, and an anomaly that needs to be detected can be detected more accurately.

OTHER EMBODIMENTS

The present disclosure is not limited to the example described in the foregoing description with reference to the drawings. For example, the following examples are also encompassed within the technical scope of the present disclosure.

In the example given above, the voltage converting device configured as a buck-boost DCDC converter is shown as an example, but the present disclosure may also be applied to a boost DCDC converter or a buck DCDC converter. Alternatively, the present disclosure may also be applied to a unidirectional DCDC converter that converts a voltage input from one side and outputs the voltage to the other side, or may also be applied to a bidirectional DCDC converter.

In the example given above, a single-phase DCDC converter is shown as an example, but the present disclosure may be applied to a multi-phase DCDC converter.

In the example given above, a configuration is shown as an example in which both the input voltage stabilized state and the output voltage stabilized state are checked, and an anomaly in which the duty ratio does not converge is detected when both the input voltage and the output voltage are stabilized. However, the present disclosure is not limited to this configuration. For example, in S2 shown in FIG. 2 and S22 shown in FIG. 3, only either the aforementioned predetermined input voltage stabilized state or the aforementioned predetermined output voltage stabilized state may be checked.

The invention claimed is:

1. A voltage converting device comprising:
a voltage converting portion configured to increase or decrease an input voltage through on/off operations of a switching element and then output the voltage;
an output voltage detecting portion configured to detect a value that indicates an output voltage of the voltage converting portion;
a setting portion configured to set, based on a set target voltage value and a detection value obtained by the output voltage detecting portion, a duty ratio of a PWM signal that is provided to the voltage converting portion so as to bring the output voltage value of the voltage converting portion closer to the target voltage value;
a driving portion configured to output the PWM signal having the duty ratio set by the setting portion to the voltage converting portion; and
an anomaly detecting portion configured to detect an anomaly in which the duty ratio set by the setting portion does not converge to a predetermined normal range when the voltage converting portion is in a predetermined stabilized state.

2. The voltage converting device according to claim 1, comprising:
an input voltage detecting portion configured to detect a value that indicates an input voltage of the voltage converting portion,
wherein the anomaly detecting portion is configured to detect the anomaly in which the duty ratio set by the setting portion does not converge to the predetermined normal range, based on the target voltage value and a detection value obtained by the input voltage detecting portion.

3. The voltage converting device according to claim 2, wherein the anomaly detecting portion is configured to determine, based on the detection value obtained by the input voltage detecting portion, whether or not the input voltage that is input to the voltage converting portion is in a predetermined input voltage stabilized state as a condition for the predetermined stabilized state, and to detect the anomaly in which the duty ratio set by the setting portion does not converge to the predetermined normal range if it is determined that the input voltage is in the predetermined input voltage stabilized state.

4. The voltage converting device according to claim 1, wherein the anomaly detecting portion is configured to determine, based on the detection value obtained by the output voltage detecting portion, whether or not an output voltage that is output from the voltage converting portion is in a predetermined output voltage stabilized state as a condition for the predetermined stabilized state, and to detect the anomaly in which the duty ratio set by the setting portion does not converge to the predetermined normal range if it is determined that the output voltage is in the predetermined output voltage stabilized state.

5. The voltage converting device according to claim 1, comprising:
an output current detecting portion configured to detect a value that indicates an output current of the voltage converting portion,
wherein the setting portion is configured to limit an increase of the duty ratio of the PWM signal that is provided to the voltage converting portion when the output current from the voltage converting portion reaches a pre-set maximum current value,
the anomaly detecting portion is configured to determine, based on the detection value obtained by the output current detecting portion, whether or not the output current from the voltage converting portion has reached the maximum current value, and to detect the anomaly in which the duty ratio set by the setting portion does not converge to the predetermined normal range if it is determined that the output current has not reached the maximum current value.

6. The voltage converting device according to claim 1, wherein, if the anomaly detecting portion detects the anomaly in which the duty ratio set by the setting portion does not converge to the predetermined normal range when the voltage converting portion is in the predetermined stabilized state, the driving portion stops outputting the PWM signal to the voltage converting portion.

7. The voltage converting device according to claim 2, wherein the anomaly detecting portion is configured to determine, based on the detection value obtained by the output voltage detecting portion, whether or not an output voltage that is output from the voltage converting portion is in a predetermined output voltage stabilized state as a condition for the predetermined stabilized state, and to detect the anomaly in which the duty ratio set by the setting portion does not converge to the predetermined normal range if it is determined that the output voltage is in the predetermined output voltage stabilized state.

8. The voltage converting device according to claim 3, wherein the anomaly detecting portion is configured to determine, based on the detection value obtained by the output voltage detecting portion, whether or not an output voltage that is output from the voltage converting portion is in a predetermined output voltage stabilized state as a condition for the predetermined stabilized state, and to detect the anomaly in which the duty ratio set by the setting portion does not converge to the predetermined normal range if it is determined that the output voltage is in the predetermined output voltage stabilized state.

9. The voltage converting device according to claim 2, comprising:
an output current detecting portion configured to detect a value that indicates an output current of the voltage converting portion,
wherein the setting portion is configured to limit an increase of the duty ratio of the PWM signal that is provided to the voltage converting portion when the output current from the voltage converting portion reaches a pre-set maximum current value,
the anomaly detecting portion is configured to determine, based on the detection value obtained by the output current detecting portion, whether or not the output current from the voltage converting portion has reached the maximum current value, and to detect the anomaly in which the duty ratio set by the setting portion does not converge to the predetermined normal range if it is determined that the output current has not reached the maximum current value.

10. The voltage converting device according to claim 3, comprising:
an output current detecting portion configured to detect a value that indicates an output current of the voltage converting portion,
wherein the setting portion is configured to limit an increase of the duty ratio of the PWM signal that is provided to the voltage converting portion when the output current from the voltage converting portion reaches a pre-set maximum current value, the anomaly detecting portion is configured to determine, based on the detection value obtained by the output current detecting portion, whether or not the output current from the voltage converting portion has reached the maximum current value, and to detect the anomaly in which the duty ratio set by the setting portion does not converge to the predetermined normal range if it is determined that the output current has not reached the maximum current value.

11. The voltage converting device according to claim 5, comprising:

an output current detecting portion configured to detect a value that indicates an output current of the voltage converting portion, wherein the setting portion is configured to limit an increase of the duty ratio of the PWM signal that is provided to the voltage converting portion when the output current from the voltage converting portion reaches a pre-set maximum current value, the anomaly detecting portion is configured to determine, based on the detection value obtained by the output current detecting portion, whether or not the output current from the voltage converting portion has reached the maximum current value, and to detect the anomaly in which the duty ratio set by the setting portion does not converge to the predetermined normal range if it is determined that the output current has not reached the maximum current value.

12. The voltage converting device according to claim 2, wherein, if the anomaly detecting portion detects the anomaly in which the duty ratio set by the setting portion does not converge to the predetermined normal range when the voltage converting portion is in the predetermined stabilized state, the driving portion stops outputting the PWM signal to the voltage converting portion.

13. The voltage converting device according to claim 3, wherein, if the anomaly detecting portion detects the anomaly in which the duty ratio set by the setting portion does not converge to the predetermined normal range when the voltage converting portion is in the predetermined stabilized state, the driving portion stops outputting the PWM signal to the voltage converting portion.

14. The voltage converting device according to claim 4, wherein, if the anomaly detecting portion detects the anomaly in which the duty ratio set by the setting portion does not converge to the predetermined normal range when the voltage converting portion is in the predetermined stabilized state, the driving portion stops outputting the PWM signal to the voltage converting portion.

15. The voltage converting device according to claim 5, wherein, if the anomaly detecting portion detects the anomaly in which the duty ratio set by the setting portion does not converge to the predetermined normal range when the voltage converting portion is in the predetermined stabilized state, the driving portion stops outputting the PWM signal to the voltage converting portion.

* * * * *